Aug. 27, 1929.  F. C. COSEO  1,726,015
BRAKE MECHANISM
Filed Dec. 8, 1925
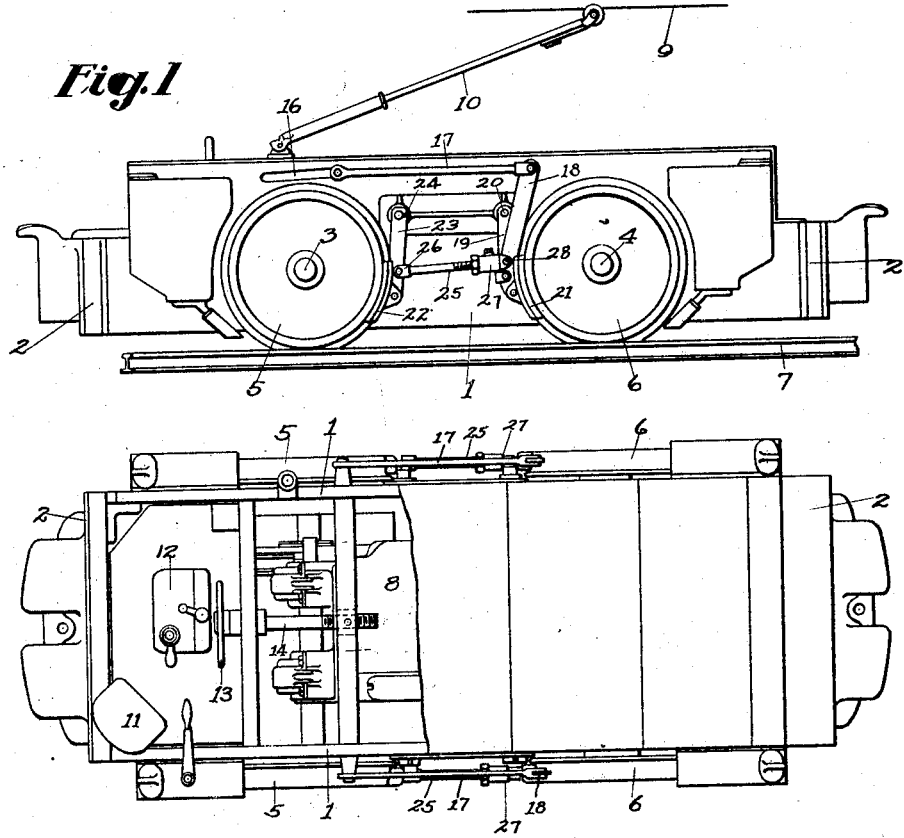
Fig.1
Fig.2
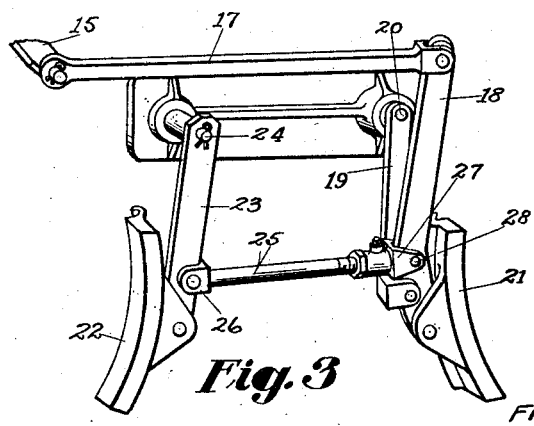
Fig.3
Inventor.
Fred C. Coseo Patented Aug. 27, 1929.

1,726,015

UNITED STATES PATENT OFFICE.

FRED C. COSEO, OF COLUMBUS, OHIO, ASSIGNOR TO THE JEFFREY MANUFACTURING COMPANY, OF COLUMBUS, OHIO, A CORPORATION OF OHIO.

BRAKE MECHANISM.

Application filed December 8, 1925. Serial No. 74,186.

The present invention relates to certain new and useful improvements in brake mechanisms, and particularly to brake mechanisms adapted to retard the movements of electric locomotives of the type commonly used in coal mines, and similar installations.

It is the especial object of this invention to provide an efficient brake mechanism, convenient of adjustment and repair and which is removed from probable contact with external objects adjacent the track along which the locomotive travels.

The means whereby I attain this object are fully set forth in the following specification, and illustrated in the accompanying drawings of which—

Fig. 1 is a side elevation of a locomotive equipped with the devices of this invention.

Fig. 2 is a plan view of the locomotive illustrated in Fig. 1 part of the cover plate being broken away to reveal the brake operating mechanism.

Fig. 3 is a perspective view on an enlarged scale of the brake mechanism illustrated in Fig. 1.

Like numerals refer to similar parts in the several figures.

In the drawings I have shown, for purposes of illustration, a locomotive having the side frames 1 and end frames 2 which are rigidly joined together to form a boxlike structure. The side frames 1 are provided with journal bearings in which are journaled the axles 3 and 4 to the projecting ends of which are fixed the driving wheels 5 and 6 which are of the usual flanged type adapted to rest upon and be guided by the track rails 7. Mounted within the boxlike frame structure are electric motors one of which is disclosed at 8, which are connected by suitable gearing with the axles to actuate the driving wheels. Current for the actuation of the motors 8 is received from the trolley wire 9 through a trolley pole 10 of the common and well known type. At the rearward end of the locomotive is mounted a seat 11 for the motorman, and positioned within convenient reach thereof is a controller 12 by which the flow of current through the motors is regulated, and a hand wheel 13 for the manipulation of the brake mechanism. The hand wheel 13 is attached to the rearward end of a longitudinally extending screw shaft 14 which is secured against longitudinal movement relative to the locomotive frame, and which engages a suitable nut attached to the cross bar 15. The cross bar 15 projects across the locomotive and is slidable in slots 16 of the locomotive frame. To the projecting end of the cross bar 15, at each side of the locomotive, is connected the link 17, which is pivotally attached to the upper end of the brake lever 18. The brake lever 18 is suspended by a link 19 from the stud 20 which projects laterally from the side frame 1 of the locomotive. Flexibly attached to the lower end of the brake lever 18 is a brake shoe 21 adapted to contact with the periphery of the forward driving wheel 6. A similar brake shoe 22 is suspended by a hanger bar 23 from the stud 24 of the side frame 1, and is arranged to contact with the periphery of the rearward driving wheel 5. Extending longitudinally of the locomotive is a strut 25 at one end of which is formed a fork 26 pivotally connected with the hanger bar 23 at a point above and adjacent to the brake shoe 22. The other end of the strut bar 25 is screw threaded into a forked head 27 which is pivotally attached to the brake lever 18 at a point above and adjacent to the brake shoe 21.

By the manipulation of the hand wheel 13 the cross bar 15 may be drawn rearwardly of the locomotive exerting a draft upon the links 17 to draw the upper ends of the brake levers 18 rearwardly thereby exerting a pressure upon the strut bar 25 to force the brake shoes 22 into contact with the driving wheels 5, after which the brake levers 18 rock upon the fulcrum 28 to press the brake shoe 21 against the driving wheel 6 thereby exerting a frictional resistance to the rotation of said driving wheels. It is apparent that rotation of the hand wheel in the opposite direction will force the cross bar 15 forwardly of the locomotive, and thereby draw the brake shoes 21 and 22 together. The position of the studs 20 and 24 relative to the driving wheels 5 and 6 is such that when so withdrawn the brake shoes will swing clear of the wheels 5 and 6.

By the arrangement of parts above described I have produced a highly efficient brake mechanism convenient of adjustment and repair and removed from probable contact with external objects adjacent the track along which the locomotive travels.

What I claim is:—

1. In an apparatus of the class described, a pair of depending hanger bars, a brake shoe carried by one of said bars, a brake lever pivoted to the lower portion of the other of said hanger bars, a brake shoe attached to said brake lever below its pivot point, and a strut connected to said brake lever above said pivot point and to said other hanger bar.

2. In an apparatus of the class described, a pair of depending hanger bars, a brake lever pivoted to the lower portion of one of said hanger bars, brake shoes attached respectively to said brake lever below its pivot point and to the lower portion of the other hanger bar, and a thrust bar connected to said brake lever above its pivot point and to said other hanger above the point of attachment of the brake shoe thereto.

3. In a locomotive comprising a frame and supporting wheels therefor, a hanger bar suspended from said frame in front of and adjacent the rearward wheel, a hanger bar suspended from the frame in the rear of and adjacent the forward wheel, a brake shoe flexibly supported on the lower end of each hanger bar, a lever pivotally connected with the forward brake shoe, and a strut extending between said lever and the rearward hanger bar and pivotally attached to them at points above and adjacent the points of flexible support of said brake shoe.

In testimony whereof I have hereunto set my hand.

FRED C. COSEO.